(12) United States Patent
Bae

(10) Patent No.: US 6,640,114 B2
(45) Date of Patent: *Oct. 28, 2003

(54) METHOD AND APPARATUS FOR DATA ENTRY IN A WIRELESS NETWORK ACCESS DEVICE

(75) Inventor: Hyon S. Bae, Burlingame, CA (US)

(73) Assignee: Youngbo Engineering, Inc. (KR)

( * ) Notice: Subject to any disclaimer, the term of this patent is extended or adjusted under 35 U.S.C. 154(b) by 11 days.

This patent is subject to a terminal disclaimer.

(21) Appl. No.: 10/080,084

(22) Filed: Feb. 21, 2002

(65) Prior Publication Data

US 2002/0082053 A1 Jun. 27, 2002

Related U.S. Application Data

(63) Continuation of application No. 09/668,334, filed on Sep. 22, 2000, which is a continuation-in-part of application No. 09/569,219, filed on May 11, 2000.

(51) Int. Cl.[7] .............................. H04B 1/38; H04M 1/00
(52) U.S. Cl. ......................................... 455/566; 455/90
(58) Field of Search .................... 455/90, 556, 557, 455/566, 422, 575; 379/433.01, 433.06, 433.07, 434; D14/137, 138; 345/157, 160, 163, 168, 169, 173, 905

(56) References Cited

U.S. PATENT DOCUMENTS

| | | |
|---|---|---|
| 5,151,946 A | 9/1992 | Martensson |
| 5,327,584 A | 7/1994 | Adachi et al. |
| 5,337,346 A | 8/1994 | Uchikura |
| 5,414,444 A | 5/1995 | Britz |
| 5,436,954 A | 7/1995 | Nishiyama et al. |
| 5,465,401 A | 11/1995 | Thompson |
| 5,584,054 A | 12/1996 | Tyneski et al. |
| 5,715,524 A | 2/1998 | Jambhekar et al. |
| 5,719,936 A | 2/1998 | Hillenmayer |
| 5,742,894 A | 4/1998 | Jambhekar et al. |
| 5,805,676 A | 9/1998 | Martino |
| 5,835,732 A | 11/1998 | Kikinis et al. |
| 5,848,356 A | 12/1998 | Jambhekar et al. |
| 5,867,795 A | 2/1999 | Novis et al. |
| 5,896,575 A | 4/1999 | Higginbotham et al. |
| 5,907,615 A | 5/1999 | Kaschke |
| 5,911,485 A | 6/1999 | Rossmann |
| 5,923,327 A | 7/1999 | Smith et al. |
| 5,959,260 A | 9/1999 | Hoghooghi et al. |
| 5,983,073 A | 11/1999 | Ditzik |
| 5,990,874 A | 11/1999 | Tsumura et al. |
| 5,991,644 A | 11/1999 | Ogawa |
| 6,009,336 A | 12/1999 | Harris et al. |
| 6,009,469 A | 12/1999 | Mattaway et al. |
| 6,016,476 A | 1/2000 | Maes et al. |
| 6,035,180 A | 3/2000 | Kubes et al. |
| 6,052,606 A | 4/2000 | Bowen |
| 6,054,990 A | 4/2000 | Tran |
| D426,218 S | 6/2000 | Abed et al. |
| 6,072,475 A | 6/2000 | Van Ketwich |
| 6,073,034 A | 6/2000 | Jacobsen et al. |
| 6,085,112 A | 7/2000 | Kleinschmidt et al. |
| 6,087,952 A | 7/2000 | Prabhakaran |
| 6,112,099 A * | 8/2000 | Ketola .......................... 455/466 |
| 6,144,551 A * | 11/2000 | Kao ............................. 345/905 |

FOREIGN PATENT DOCUMENTS

| | | |
|---|---|---|
| EP | 0898405 | 2/1999 |
| GB | 2289555 | 11/1995 |
| GB | 2339505 | 1/2000 |
| GB | 2348075 | 9/2000 |

* cited by examiner

Primary Examiner—Quochien Vuong
(74) Attorney, Agent, or Firm—Altheimer & Gray; Michael A. Molano; John F. Griffith

(57) ABSTRACT

A method and apparatus for adding at least one and preferably two new data entry functions to otherwise conventional flip-type cell phones. One such data entry function is handwritten alpha-numeric entry using the fingertip as the entry device. The other such data entry function is use of the fingertip for point and click. Thus, the apparatus does not require a special tool for data entry. A button or switch added on the side of the phone, permits switching between the two data entry functions. By depressing a button on the side, the user can use the touch pad as a point and click device. This will allow service providers to offer user friendly web pages that look and feel like surfing the web at home or office. The invention also offers the ability to operate both the numeric phone keypad and the touch pad simultaneously.

22 Claims, 2 Drawing Sheets

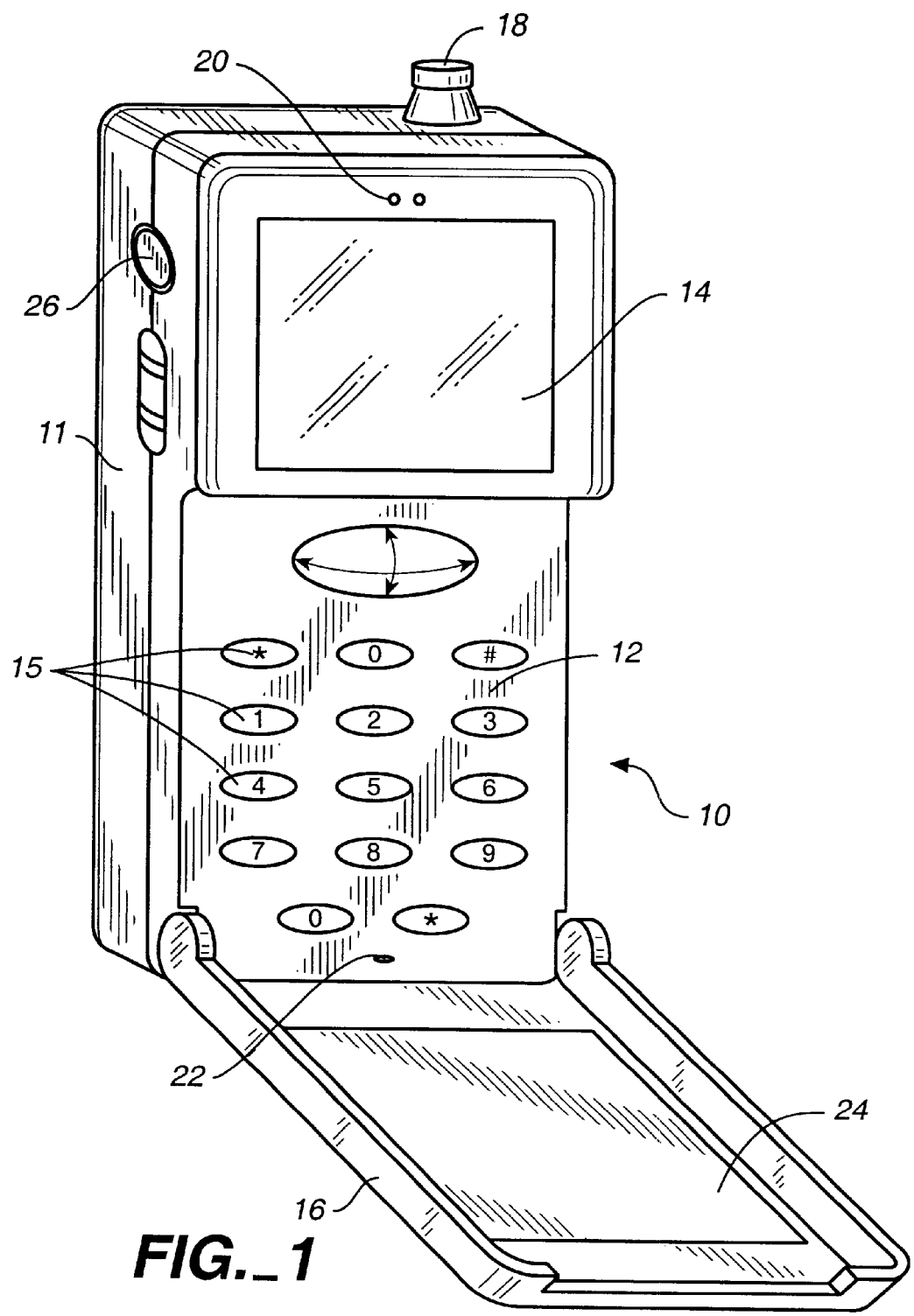
FIG._1

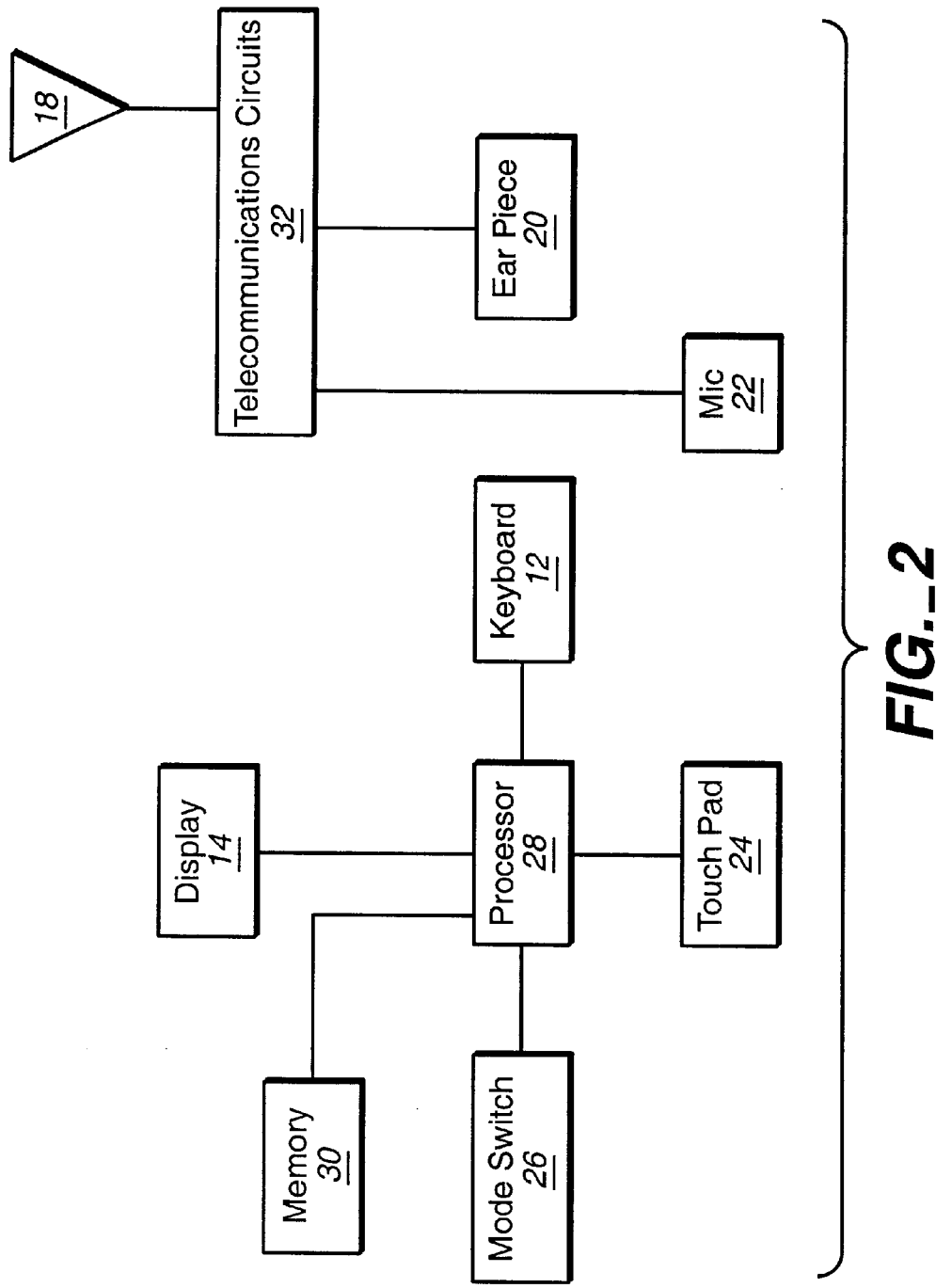
FIG._2

METHOD AND APPARATUS FOR DATA ENTRY IN A WIRELESS NETWORK ACCESS DEVICE

This is a continuation of pending application Ser. No. 09/668,334 filed Sep. 22, 2000, which is a continuation-in-part of pending application Ser. No. 09/569,219 filed May 11, 2000.

BACKGROUND OF THE INVENTION

1. Field of the Invention

The present invention relates generally to the field of wireless network access devices such as the mobile or cellular phone. The invention relates more specifically to use of a touch pad pointing device in the flip key pad cover of a mobile or cell phone to enable fingertip data entry as well as point and click (mouse) control of a cursor on a display portion of the phone.

2. Background Art

With the deployment and rapid expansion of wireless Internet (HDML), the demands for wireless Internet devices are also growing at a rapid rate. One of the most popular classes of wireless Internet devices is the mobile phone. They are popular because they are compact and offer multiple functions; such as telephone, PDA and Internet Access. Their biggest drawback is the difficulty in entering alpha-numeric data to utilize the PDA and Internet functions. The fundamental design of a phone and the continuing miniaturization of the device make it that much more difficult to enter alphanumeric data.

There are a number of previously issued U.S. Patents which disclose mobile and cell phones having added input functions such as extra function keys, a touch pad that works in contact with alpha-numeric keys and a touch pad that permits adjustment of certain phone parameters such as volume and the like. However, none of the prior art known to the applicant provides a convenient manual data entry mechanism that may also provide mouse-type point and click cursor control.

SUMMARY OF THE INVENTION

The present invention comprises a method and apparatus for adding at least one and preferably two new data entry functions to otherwise conventional flip-type cell phones. One such data entry function is handwritten alpha-numeric entry using the fingertip as the entry device. The other such data entry function is use of the fingertip for point and click. A button or switch added on the side of the phone, permits switching between the two data entry functions.

By utilizing software, such as the Palm Graffiti® system or Microsoft's Windows CE®, the user can enter alphanumeric data by hand writing in the touch pad area. The invention offers the additional advantage of not requiring a special tool such as a pointer or pen. Due to the relatively large area of the touch pad, the user can enter the data with his or her fingertip.

By depressing a button on the side, the user can use the touch pad as a point and click device. This will allow service providers to offer user friendly web pages that look and feel like surfing the web at home or office.

The invention also offers the ability to operate both the numeric phone keypad and the touch pad simultaneously.

Also, the invention impacts the overall size only minimally. The additional height requirement for the touch pad is only 1 mm.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 1 illustrates a preferred embodiment of the invention shown in an operational configuration with the hinged key pad cover opened to reveal the touch pad member ready for use.

FIG. 2 is a schematic block diagram of the interior circuits of the embodiment of FIG. 1.

DETAILED DESCRIPTION OF THE INVENTION

Referring to the accompanying drawing figures, it will be seen that a cell phone 10 comprises a housing 11 including a numeric keypad 12 comprising a plurality of keys 15. The phone 10 further comprises an LCD or equivalent display 14, a hinged keypad cover 16 and an extendable antenna 18 extending from the upper end of housing 11. Also provided are speaker or ear piece 20 and microphone or mouthpiece 22.

Cellular telephone 10 features a touch pad member 24 and a mode switch 26. Touch pad devices are well known in the electronic data arts. For example, U.S. Pat. No. 5,856,822 issued Jan. 5, 1999 to Du et al. and U.S. Pat. No. 5,956,019 issued Sep. 21, 1999 Bang et al. disclose touch pad devices. To the extent that each such patent discloses the technical characteristics of touch pad devices, such disclosures are hereby incorporated herein by reference.

Mode switch 26 provides for two distinct modes of operation for touch pad member 24. In a first mode, the touch pad member provides for manual data entry, such as by fingertip contact or use of a stylus (not shown), for handwritten alphanumeric data. This mode can be readily accomplished on touch pad member 24 by utilizing software such as the Palm Graffiti® system or Microsoft's Windows CE® that is stored in memory 30 for use by processor 28.

In a second mode, touch pad member 24 provides for computer mouse-type point and click operation such as commonly found on laptop computers. As seen in FIG. 1, touch pad member 24 occupies substantially all of the inside planar surface of keypad cover 16, but without adding any significant thickness to the keypad cover. Moreover, switch 26 does not add significantly to the volume of phone 10 or to the dimensions of housing 11. Thus the invention adds significant new data entry capabilities to a cell phone such as for facilitating use of the phone in an Internet browser mode of operation. Yet such novel features are provided without any significant change in the dimensions of the underlying mobile or cellular phone.

As shown in FIG. 2, the interior circuits of phone 10 include a processor 28 for controlling and interconnecting the telecommunications circuits and user interface components of phone 10. The telecommunications circuits 32 include the necessary transmitter circuits, receiver circuits and audio amplification circuits required for cellular phone communication, as are well known in the art. Telecommunications circuits 32, in addition to being coupled to processor 28, has a radio frequency output coupled to antenna 18, an audio output coupled to ear piece 20, and an audio input coupled to microphone 22. The processor 28 operates in conjunction with memory 30 coupled thereto, which memory includes both volatile and non-volatile storage devices. Processor 28 is coupled to keyboard 12, display 14, touch pad 24, and mode switch 26 for interfacing with the user of phone 10. The mode switch input to processor 28 being utilized to initiate predetermined programs for interpreting inputs from touch pad 24, as discussed above.

Having thus disclosed a preferred embodiment of the invention, it being understood that various modifications and additions are contemplated and will now be apparent to those having the benefit of the above description.

What is claimed is:

1. A wireless network access device comprising:
   a housing;
   a processor disposed in the housing;
   a display mounted to the housing and connected to the processor;
   a telecommunications circuit disposed in the housing and connected to the processor for at least one of receiving and transmitting communication data;
   an antenna extending from the housing and connected to the telecommunications circuit;
   a touch pad member coupled to the housing and separate from the display, the touch pad member connected to the processor, the touch pad member having a manual data entry function in which the member is responsive to input contact for manual data entry, and having a computer mouse function in which the member is responsive to point and click input for control of a cursor on the display; and
   a mode switch mounted to the housing and connected to the processor for selection of one of the manual data entry function and the computer mouse function, the mode switch remotely located from the touch pad member.

2. The wireless network access device of claim 1, further comprising a speaker mounted in the housing and a microphone mounted in the housing.

3. The wireless network access device of claim 1, further comprising:
   a keyboard mounted to the housing and connected to the processor; and
   a keyboard cover coupled to the housing, the cover having an interior surface.

4. The wireless network access device of claim 3, wherein the keyboard cover is hinged to the housing.

5. The wireless network access device of claim 3, wherein the touch pad member is mounted on the keyboard cover.

6. The wireless network access device of claim 3, wherein the touch pad member is mounted on the interior surface of the keyboard cover.

7. The wireless network access device of claim 3, wherein the keyboard is at least one of an alpha-numeric keyboard, an alpha-numeric keypad and a numeric keypad.

8. The wireless network access device of claim 1, wherein the input contact is made by at least one of a stylus or a pointing device.

9. The wireless network access device of claim 1, wherein the input contact is made by fingertip.

10. The wireless network access device of claim 1, wherein the manual entry data is alpha-numeric data.

11. In a wireless network access device having a housing, a keyboard, a display, a speaker, a microphone, an antenna, interior circuits including a processor, and a keyboard cover, the keyboard cover having an interior surface, an improvement comprising:
    a touch pad member coupled to the housing and separate from the display, the touch pad member being mounted on the keyboard cover and connected to the processor, the touch pad member having a manual data entry function in which the member is responsive to input contact for manual data entry, and having a computer mouse function in which the member is responsive to point and click input for control of a cursor on the display; and
    a mode switch connected to the processor for selection of at least two distinct data entry functions of the touch pad member, a first of the functions being the manual data entry function and a second of the functions being the computer mouse function, the mode switch extending from the housing and remotely located from the touch pad member.

12. The improvement of claim 11, wherein the touch pad member is mounted on the interior surface of the keyboard cover.

13. A method for constructing a wireless network access device, the method comprising:
    providing a housing;
    disposing interior circuits, including a processor and a telecommunications circuit, in the housing;
    mounting a display to the housing;
    connecting the display to the processor;
    connecting an antenna to the telecommunications circuit;
    coupling touch pad member to the housing separate from the display;
    connecting the touch pad member to the processor;
    configuring the touch pad member to be responsive to input contact for cursor control on the display and input contact for manual data entry;
    providing a mode switch which extends from the housing and is remotely located from the touch pad member; and
    connecting the mode switch to the processor for selecting between a manual data entry mode of operation and a cursor control mode of operation of the touch pad member.

14. The method of claim 13, further comprising mounting a speaker in the housing and mounting a microphone in the housing.

15. The method of claim 13, further comprising:
    mounting a keyboard to the housing;
    connecting the keyboard to the processor; and
    providing a keyboard cover for the housing, the cover having an interior surface.

16. The method of claim 15, wherein the keyboard cover is hinged to the housing.

17. The method of claim 15, wherein the touch pad member is mounted on the interior surface of the keyboard cover.

18. The method of claim 13, wherein the input contact is made by at least one of a stylus, a pointing device, or fingertip.

19. A wireless communication network portable phone device comprising:
    a housing;
    a processor disposed in the housing;
    a keyboard mounted to the housing and connected to the processor;
    a display mounted to the housing and connected to the processor;
    a speaker mounted in the housing;
    a microphone mounted in the housing;

a keyboard cover coupled to the housing;

a touch pad member coupled to the housing and separate from the display, the touch pad member being mounted on the keyboard cover and connected to the processor, the touch pad member having a manual data entry function in which the member is responsive to input contact for manual data entry, and having a computer mouse function in which the member is responsive to input contact for point and click controlling of a cursor on the display; and a mode switch mounted to the housing and connected to the processor, the mode switch enabling selection of one of the manual data entry function and the computer mouse function, the mode switch remotely located from the touch pad member.

20. The wireless communications network portable phone device of claim 19, wherein the touch pad member is mounted on an interior surface of the keyboard cover.

21. A wireless communications network portable phone device comprising:

a housing;

a processor disposed in the housing;

a keyboard mounted to the housing and connected to the processor;

a display mounted to the housing and connected to the processor;

a speaker mounted in the housing;

a microphone mounted in the housing;

a keyboard cover coupled to the housing;

a touch pad member coupled to the housing and separate from the display, the touch pad member being mounted on the keyboard cover and connected to the processor, the touch pad member having a manual data entry function in which the member is responsive to input contact for manual data entry, and having a computer mouse function in which the member is responsive to input contact for point and click controlling of a cursor on the display; and a mode switch mounted to the housing and connected to the processor, the mode switch enabling selection of one of the manual data entry function and the computer mouse function, the mode switch remotely located from the touch pad member.

22. The wireless communications network portable phone device of claim 21, wherein the touch pad member is mounted on an interior surface of the keyboard cover.

* * * * *